United State
Plummer

[11] 3,735,685
[45] May 29, 1973

[54] REFLECTIVE IMAGING APPARATUS
[75] Inventor: William T. Plummer, Concord, Mass.
[73] Assignee: Polaroid Corporation, Cambridge, Mass.
[22] Filed: May 7, 1971
[21] Appl. No.: 141,253

[52] U.S. Cl....................................95/42, 350/211
[51] Int. Cl..........................G03b 19/12, G02b 3/08
[58] Field of Search ..........................95/42; 350/211

[56] References Cited
UNITED STATES PATENTS

| | | | |
|---|---|---|---|
| 2,914,997 | 12/1959 | Gray | 95/42 |
| 2,600,514 | 6/1952 | Mitchell | 240/103 R |
| 3,523,720 | 8/1970 | Schiele | 350/211 |
| 2,751,816 | 6/1956 | Strong | 350/211 |
| 3,523,721 | 8/1970 | Hofmann | 350/211 |

*Primary Examiner*—Samuel S. Matthews
*Assistant Examiner*—Michael Harris
*Attorney*—Brown and Mikulka

[57] ABSTRACT

A reflex camera having an aberration reducing image reflection surface for use in viewing an image, transmitted through an entrance pupil to the image reflection surface, at an exit pupil remote from both the reflection surface and the entrance pupil.

The reflective surface is generally planar and so formed as to provide a plurality of ellipsoidal segments extending thereover. The ellipsoidal segments are provided with common foci, whereby any light passing through the entrance pupil and impinging on any of the ellipsoidal segments will be reflected to the exit pupil.

23 Claims, 11 Drawing Figures

INVENTOR.
WILLIAM T. PLUMMER
BY Brown and Mikulka
and
Michael Bard
ATTORNEYS

PATENTED MAY 29 1973 3,735,685

INVENTOR.
WILLIAM T. PLUMMER
BY Brown and Mikulka
and
Michael Bard
ATTORNEYS

PATENTED MAY 29 1973

INVENTOR.
WILLIAM T. PLUMMER
BY Brown and Mikulka
and
Michael Bard
ATTORNEYS

REFLECTIVE IMAGING APPARATUS

BACKGROUND OF THE INVENTION

The subject invention relates generally to photographic cameras of the reflex variety and, more particularly, to such a camera wherein an image formed therewithin, by light from an entrance pupil, may be viewed at a predetermined remote exit.

It is well known that various types of optical apparatus have been employed in prior art systems for precisely imaging light emanating from a point source, or appearing to so emanate, to a predetermined remote point. Such devices have found utility in various photographic applications and have additionally found application in spectroscopic and spectrometric devices.

It has long been known that a concave spherical-shape mirror may be utilized to reflect light from a point source to a remote predetermined point. In order to effect such reflection, it is often necessary that the point source be positioned off the optical axis of the spherical-shape mirror. The ease of obtaining and/or fabricating such a spherical-shape mirror and, hence, the desirability of its use for the purposes aforesaid should be readily apparent.

Not infrequently, however, it is necessary that the optical means utilized for imaging a real or apparent point source to another point be essentially flat or planar. Where such is the case, it has been found expedient to resort to a mirror utilizing the principles of a Fresnel lens. Such a mirror may be envisioned by considering a concave spherical-shape mirror divided into a plurality of frusta, each formed by the intersection of a pair of spaced parallel planes with said mirror normal to the optical axis thereof. If each of said plural frusta are concentrically arranged on a flat surface, a reflective device will be created approximating the same optical qualities as said spherical-shape mirror, but one which is essentially planar. Such a planar approximation of a concave spherical-shape mirror may be referred to as a Fresnel-type mirror.

It should be readily apparent that the Fresnel-type mirror is preferred to its concave spherical-shape counterpart for many applications, if for no other reason, than because of its compactness of size and ease of fabrication.

Unfortunately, the off-axis use of a concave spherical-shape mirror, or its Fresnel-type counterpart, entails several disadvantages. As is well known in the art, the use of such structure invariably results in attendant image distortion, due to the inherent aberrations in the mirror's structure, such as astigmatism and coma.

Coma, of course, is an aberration affecting only points off the optical axis and it is known that coma is directly proportional to the distance of such points from said optical axis. It is known, too, that astigmatism varies with the square of the image height and, hence, we find that the very use to which it is desired to put the concave spherical-shape mirror, or its Fresnel-type counterpart (i.e., reflection in an off-axis mode), is one wherein significant coma and astigmatism will be introduced.

In order to provide point-to-point reflec-tion, as aforesaid, without attendant astigmatism and coma, a novel image-reflection means was developed which is the subject of U. S. application Ser. No. 83,030, filed Oct. 22, 1970, now U.S. Pat. No. 3,690,240, for "Reflective Imaging Apparatus" by Nathan Gold. The novel reflective imaging apparatus, aforesaid, envisions a relatively planar reflecting surface comprising a plurality of discrete facets each so oriented that light emanating from a real or apparent point source will be reflected therefrom and imaged at a remote predetermined point.

It has been found that in some applications requiring extremely high optical acuity, the use of a multi-faceted planar reflecting surface such as taught in U. S. Pat. No. 3,690,240, aforesaid, does not provide an economic expedient.

SUMMARY OF THE INVENTION

The present invention contemplates a novel reflex camera incorporating image-reflection means for reflecting the image of an entrance pupil or point source to a remote predetermined point or exit pupil. The instant invention accomplishes this function without introducing significant aberration, such as coma or astigmatism to the image.

Briefly, one embodiment of the instant invention envisions a relatively planar reflecting surface comprising a plurality of ellipsoidal segments each so oriented that light emanating from a real or apparent point source will be reflected therefrom and imaged at a remote predetermined point. Additionally, the instant invention provides a means for insuring that substantially all of the light entering the entrance pupil of an optical system will be transmitted to a predetermined remote exit pupil.

Consider a generally planar surface covered with a plurality of continuous concentric ellipsoidal segments. Consider further, a pair of conjugate points disposed outwardly of said planar surface with each of said ellipsoidal segments corresponding to the intersection of an ellipsoid, having said conjugate points as foci, with said planar surface. Clearly, an ellipsoid having foci as aforesaid and having a reflective surface, will reflect light emanating from one of said foci to the other of said foci. Equally clear, each of said ellipsoidal segments lying on the surface of successively larger ellipsoids having common foci will likewise reflect any light impinging on such segment from one of said foci to the other of said foci. Thus, the planar surface comprising such plurality of ellipsoidal segments will function to image an entrance pupil positioned with one of said foci at the center of said pupil such that the other of said foci will lie at the center of such image.

Accordingly, it is an object of the present invention to provide a camera including means for reflecting light from a fixed point source to a predetermined point.

Another object of the instant invention resides in the provision of relatively aberration-free means for imaging light emanating from a real or apparent source to a predetermined point.

It is a further object of the present invention to provide a viewing system for a photographic camera having relatively aberration free and essentially planar means for imaging the entrance pupil of such viewing system to a predetermined remote location.

Yet a further object of this invention is to provide a relatively planar reflecting surface for use in the viewing system of a reflex camera to enable the off-axis viewing of an image.

A still further object of this invention is to provide a viewing system for a reflex photographic camera having a screen upon which an image is formed with said screen being specially designed to maximize light received from a remote subject and reflected to a remote viewing station.

It is an additional object of this invention to provide a reflective optical device that is essentially planar and characterized by a series of continuous reflective echelon surfaces of non-uniform pitch.

A still additional object of this invention is to provide a refractive optical device that is essentially planar and characterized by a series of continuous echelon surfaces of non-uniform pitch.

DESCRIPTION OF THE DRAWINGS

Other objects and many of the attendant advantages of the present invention will be better appreciated and said invention will become clearly understood by reference to the following detailed description when considered in conjunction with the accompanying drawings illustrating three embodiments of the instant invention, wherein.

DETAILED DESCRIPTION OF THE INVENTION

Figure 1:
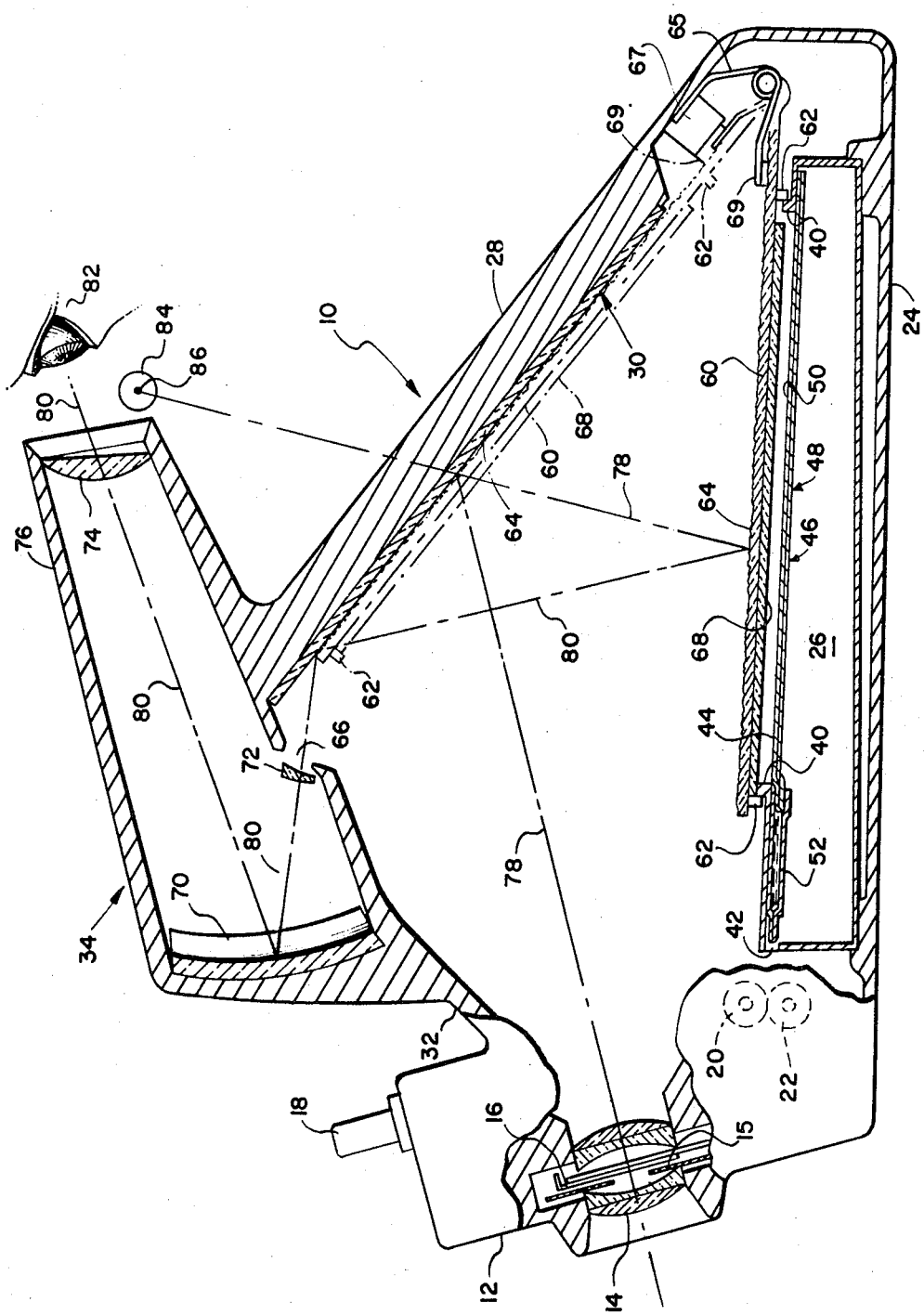
FIG. 1 provides a fragmentary cross-section of a reflex camera embodying the instant invention.

Referring now to the drawings in more detail and, more particularly, to FIG. 1, a photographic camera of the type more fully described in copending application, Ser. No. 28,567, filed Apr. 15, 1970, by Edwin H. Land, is illustrated generally at 10. The camera 10 is formed having forwardly disposed exposure control system compartment 12 within which are mounted all of the components required to regulate light passing into the camera. These components include, but are not limited to, an objective lens assembly shown generally at 14, an aperture stop 15, a shutter mechanism 16, a shutter release button 18, electronic control circuitry (not shown), and a pair of film unit processing rolls 20 and 22.

The reflex camera 10 has a bottom support portion 24 which serves as a receiving and retaining station for a film cassette 26. The uppermost surfaces of the reflex camera 10 include a relatively elongated top wall section 28 which supports a reflex viewing mirror 30. The elongated top wall section 28 is joined with a shorter forward wall portion 32, both of which serve to support a viewing device 34. The film cassette 26, positioned within the bottom support portion 24 in the lowermost region of the reflex camera 10, is formed as a generally thin parallelepiped having a top open portion, the rectangular periphery of which is defined by an integrally formed lip 40. The forwardmost facing end of the film cassette 26 is formed incorporating an opening or slot 42 aligned with the line of tangency between the processing rolls 20 and 22. The film cassette 26 is removably insertable into the cassette receiving station within the bottom support portion 24 (by means not shown) so as to consistently and accurately orient an exposure plane 44 established at the lowermost periphery of the film plane opening defined by the lip 40.

Coincidentally situated at the exposure plane 44 is the uppermost film unit 46 of the plurality of film units (not shown) contained within the film cassette 26. The film units are described in detail in U.S. Pat. No. 3,415,646, entitled "Novel Photographic Products and Processes", issued to E. H. Land on Dec. 10, 1968 and commonly assigned herewith. The film units include all of the materials necessary to produce a direct, positive photographic print. Each film unit 46 is physically structured to include a photosensitive sheet 48 positioned adjacent and in laminar relationship with a transparent sheet 50. The transparent sheet 50 is located upwardly from the photosensitive sheet 48 and is urged by spring means (not shown) into the exposure plane 44.

A rupturable container 52 of processing fluid is secured to one end of the laminar assembly of the sheets 48 and 50. The container 52 is located forwardly within the film cassette 26. Applying pressure to the container 52 causes it to rupture, dispensing its processing fluid between the sheets 48 and 50. Processing is most readily accomplished in the camera 10 by advancing the film unit 46, the rupturable container 52 foremost, through the slot 42 and between the pressure-applying processing rolls 20 and 22.

The pressure applied by the processing rolls 20 and 22 causes the container 52 to rupture, thereby dispensing its fluid contents between the sheets 48 and 50. Thereafter, the rolls 20 and 22 spread the fluid between and in contact with the two sheets 48 and 50.

The chemistry is now well known in the art and involves the formation of transfer substances in the exposed photosensitive sheet accompanied by their diffusion in a manner forming a visible, positive image. In the film unit 46, shown herein and described in the aforementioned U. S. patent, the processing fluid includes an opacifying agent which is spread as a layer between a photosensitive sheet 48 and the transparent sheet 50. It is opaque to actinic light and provides a background to a photosensitive transfer image evolved in the process.

Certain components of the reflex camera 10 normally assume one position for operation in a focusing mode configuration. During the photographic recording cycle, however, these components are reoriented to assume an exposure mode configuration. In FIG. 1, the components of the reflex camera 10 are shown positioned in the focusing mode configuration. In the exposure mode, a capping plate 60 rotates about an axle to the position proximate the top wall 28 where it is illustrated in broken lines.

In the focusing mode configuration, as shown, the exposure plane 44 is covered by the capping plate 60 which prevents light from striking the film unit 46. The capping plate 60 has, on its underside, ribs 62 positioned to fit over the lip 40 of the film cassette 26 in order to effect a lighttight seal. The top surface of the capping plate 60 supports an opaque reflective focusing screen 64 which forms the basis of two embodiments of the present invention and about which more will appear infra.

The focusing screen 64 is the surface upon which the objective lens assembly 14 forms the subject's image for focusing and framing purposes. A spring 65 bears against the top of the capping plate 60 and the underside of the top wall 28 urging said capping plate 60 down over the opening in the film cassette 26.

The reflex camera 10 is converted to the recording mode configuration when the capping plate 60 is rotated (by means not shown) upward to the position shown in broken lines. A magnet 67, fixed to the top wall 28, engages a keeper 69 fixed to the capping plate 60, thereby latching the capping plate 60 in the recording mode against the biasing forces of the spring 65. A cover plate (not shown) is positioned over an entrance aperture 66 to the viewfinder assembly 34 to prevent light from reaching the film unit 46 through the viewer assembly 34 when the exposure plane 44 is not covered by the capping plate 60.

Attached to the underside of the capping plate 60 is a reflex recording mirror 68. Rotating the capping plate 60 upward brings the reflex recording mirror 68 into a position adjacent the reflex viewing mirror 30. With the capping plate 60 latched in the recording mode configuration, the reflex recording mirror 68 can reflect light rays, refracted by the objective lens 14, to the film unit 46 since the exposure plane 44 is no longer covered.

In the focusing mode configuration, light rays are refracted by the objective lens assembly 14 and reflected by the reflex viewing mirror 30 toward the opaque reflective focusing screen 64. The objective lens assembly 14 is adjusted to focus a real image of the subject on the focusing screen 64. As described hereinafter, substantially all of the light forming the real image is reflected upward from the focusing screen 64 and forward by the reflex viewing mirror 30, entering the viewing device 34 through its entrance aperture 66. The light entering the viewing device 34 is reflected rearwardly by a concave mirror 70 which forms the light into an erect, unreverted image of the subject. The sharpness of the image seen in the viewing device 34 is a direct indication of the sharpness the photographic image will have. Therefore, such image can be used to focus the objective lens assembly 14.

The focusing screen 64 is preferably somewhat smaller than, but with the same shape as, the film format at the exposure plane 44. If the focusing screen 64 has the same shape as the film format, it aids in framing the subject. Having the focusing screen 64 slightly smaller than the film format reduces the chances of accidentally cutting off a portion of the subject by a minor framing error.

For purposes of illustration, the objective lens assembly 14 and aperture stop 15, in the focusing mode configuration, may be considered to define a mean optical path which is designated by the path line 78. The optical path, as designated at 78, passes from the objective lens assembly 14 and across the exposure chamber of the camera 10 until it impinges upon and is reflected from the reflex viewing mirror 30.

Upon reflection from the reflex viewing mirror 30, the optical path 78 courses to the focusing screen 64. Light rays redirected from the focusing screen 64 are illustrated by a path line 80 and are reflected to the viewing device 34 via the reflex viewing mirror 30, through the entrance aperture 66 and a prismatic refractor 72 to the concave mirror 70. The concave mirror 70 forms a real, erect, unreverted image of the subject, and an eye lens 74 magnifies the image for a person viewing from an eye station 82, but does not affect its erect, unreverted nature. The magnified image is a virtual one. A casing 76 supports and protects the viewing device 34's optical components and also excludes ambient light so that the image is not hidden by glare.

The objective lens assembly 14 functions to define an entrance pupil 84 which, due to the reflex viewing mirror 30 and the length of the optical path 78, appears to be positioned with its pupil point at the point 86 with respect to the focusing screen 64.

The focusing screen 64 comprises a plurality of concentric reflecting echelon surfaces (to be more fully described infra) of such orientaton that with the entrance pupil 84 positioned with the point 86 at its pupil point, substantially all of the light passing through said entrance pupil 84 and incident on said focusing screen 64, will be reflected therefrom via said reflex viewing mirror 30 through said entrance aperture 66 to said viewing device 34.

In essence, the entrance pupil 84 is imaged at the entrance aperture 66. Also, because light reflected from the focusing screen 64 is concentrated at said entrance aperture 66, it should be clear that a bright view of the image focused onto the focusing screen 64 may be seen by placing the eye at said entrance aperture 66 or such image may be seen at a remote location such as the viewing station 82 by means of the viewing device 34 which may be thought of as defining a new exit pupil by imaging the entrance aperture 66 at said eye station 82. Furthermore, it should be noted that light will be reflected from the focusing screen 64 to the entrance aperture 66 without introducing comatic of astigmatic aberration into the image of the entrance pupil 84.

A useful operating sequence for use with the reflex camera 10 of the present invention begins with the focusing mode wherein the capping plate 60 seals the opening in the film cassette 66 to prevent exposure of the film units 46 therein. In the focusing mode, the shutter mechanism 16 is in the open position permitting the objective lens assembly 14 to form an image at the reflective focusing screen 64. After focusing the reflex camera 10, the operator simply presses the release button 18 to initiate the following sequence of steps: the shutter mechanism 16 closes and the cover plate blocks the entrance aperture 66; next, the capping plate 60 rotates upwardly uncovering the uppermost film unit 46 and bringing the reflex recording mirror 68 into position; thereafter, the shutter mechanism 16 automatically exposes the film unit 46; and, after the shutter mechanism 16 closes, the capping plate 60 rotates downward sealing the film cassette 26 again and the other components then return to their focusing mode positions, as aforesaid.

The magnetic latching arrangement 67, 69, and the thicknesses of both the capping plate 60 and the reflex recording mirror 68 are selected so that the optical path distance between the objective lens assembly 14 and the focusing screen 64, via the reflex viewing mirror 30, is exactly the same as the optical path distance between the objective lens assembly 14 and the exposure plane 44, via the reflex recording mirror 68. With that relationship assured, any image which is seen to be sharply focused on the focusing screen 64, will also be sharply focused at the exposure plane 44 when the capping plate 60, with the reflex recording mirror 68, rotates upward to convert the camera into the recording mode configuration.

For a better understanding of how the viewing device 34 functions in relation to the reflex camera 10, reference may be had to copending application, Ser. No. 98,356, filed Dec. 15, 1970, by James G. Baker, and commonly assigned herewith.

Figure 2:
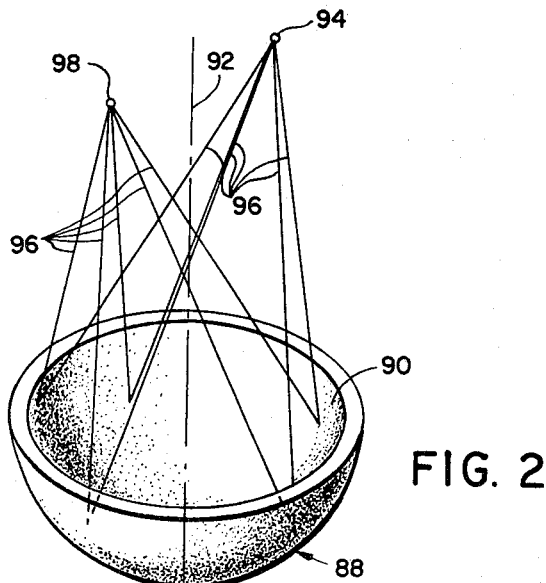
FIG. 2 is a simplified perspective of a prior art point-to-point imaging device.

Referring again to FIG. 2 in more detail, a concave spherical-shape mirror is shown generally at 88 having a reflecting surface 90 that is concave, opening upward, and is symmetrically disposed about an axis 92 which serves as an optical axis for the mirror 88. A point source of light is shown at 94 disposed outward of both the reflecting surface 90 and the optical axis 92. In practice, the point source 94 may be a real or apparent source, i.e., it may, for example, correspond to an extended light source imaged at the focal point of a lens.

A plurality of light rays 96 are shown emanating from the point source 94 and impinging on the reflecting surface 90. By virtue of the shape of the reflecting surface 90 and the positioning of the point source 94 with respect to said surface 90 and the optical axis 92, the light rays 96 impinging on said surface 90 will be reflected therefrom and imaged in the general vicinity of a point 98. The position of the image point 98 will be predetermined by that of the point source 94 with respect to the reflecting surface and the optical axis 92 and the optical properties of said surface 90.

The term "general vicinity" of the point 98 has been used because effective and precise point-to-point reflective imaging has in the past been possible only through the use of very sophisticated optical surfaces. Also, in addition to its failure to provide accurate point-to-point reflective imaging, the mirror 88, by virtue of its geometry, introduces comatic and astigmatic aberration into the image of the point source 94 reflected to the image 98. Such aberration depends from the perpendicular distance from the point source 94 to the optical axis 92.

In addition to the foregoing, many prior art devices suffer from a common defect in that they inherently take up an unnecessary amount of space. In an effort to overcome this space problem, the prior art mirror 88 of FIG. 2 evolved into the configuration illustrated in FIG. 3.

Figure 3:
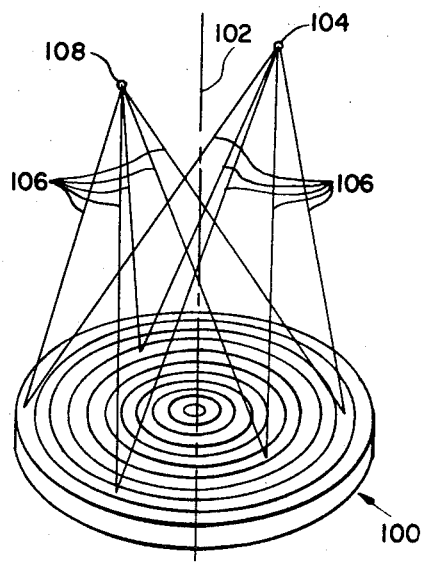
FIG. 3 provides a perspective of an improved prior art point-to-point imaging device.

Referring to FIG. 3 in more detail, a Fresnel-type mirror is shown generally at 100 symmetrically disposed about an optical axis 102. The Fresnel-type mirror 100 represents an attempt to reduce the mirror 88 of FIG. 2 to an essentially planar structure and fairly accurately approximates the imaging characteristics of mirror 88. Thus, if we consider a real or apparent point source of illumination 104 positioned outward of the mirror 100 and the optical axis 102, light rays 106 emanating from point source 104 will impinge on the reflective surfaces of the mirror 100 and be imaged in the vicinity of a point 108. As in the case of the spherical-shape concave mirror 88 of FIG. 2, comatic and astigmatic aberration will be introduced into the image appearing at the point 108 in an amount dependent on the perpendicular distance from the point source 104 to the optical axis 102 of the device of FIG. 3.

Referring again to FIG. 4, a set of three mutually orthogonal axes are shown identified as X—X Y—Y, and Z—Z in a well-known manner. A plurality of concentrically disposed ellipsoids 110, 112, and 114 are shown having common foci 116 and 118.

The ellipsoids 110, 112, and 114 have coincident major axes coincident with the Y—Y axis and coincident minor axes coincident with the X—X and Z-Z axes, respectively.

Before proceeding further it should be noted that it is the property of an ellipsoid that a line normal to any point along the concave surface thereof will bisect the angle formed by lines extending from the foci of said ellipsoid to said point. Accordingly, if we consider a point source of light located at one of said foci, it is clear that any light from the point impinging on the concave surface of such ellipsoid will, if the concave surface is reflective, be reflected therefrom to the other foci of said ellipsoid.

Thus, if, for example, we consider a point source of light located at the focus 116 and further considering the inner surfaces of the ellipsoids 110, 112, and 114 to be reflective, it is clear that any light from the point 116 incident on the inner sur-face of any of the ellipsoids 110, 112, and 114 will be reflected to the focus 118. Such reflection is true regardless at what point light emanating from the focus 116 impinges on the inner surface of any of said ellipsoids 110, 112, and 114.

Figure 4:
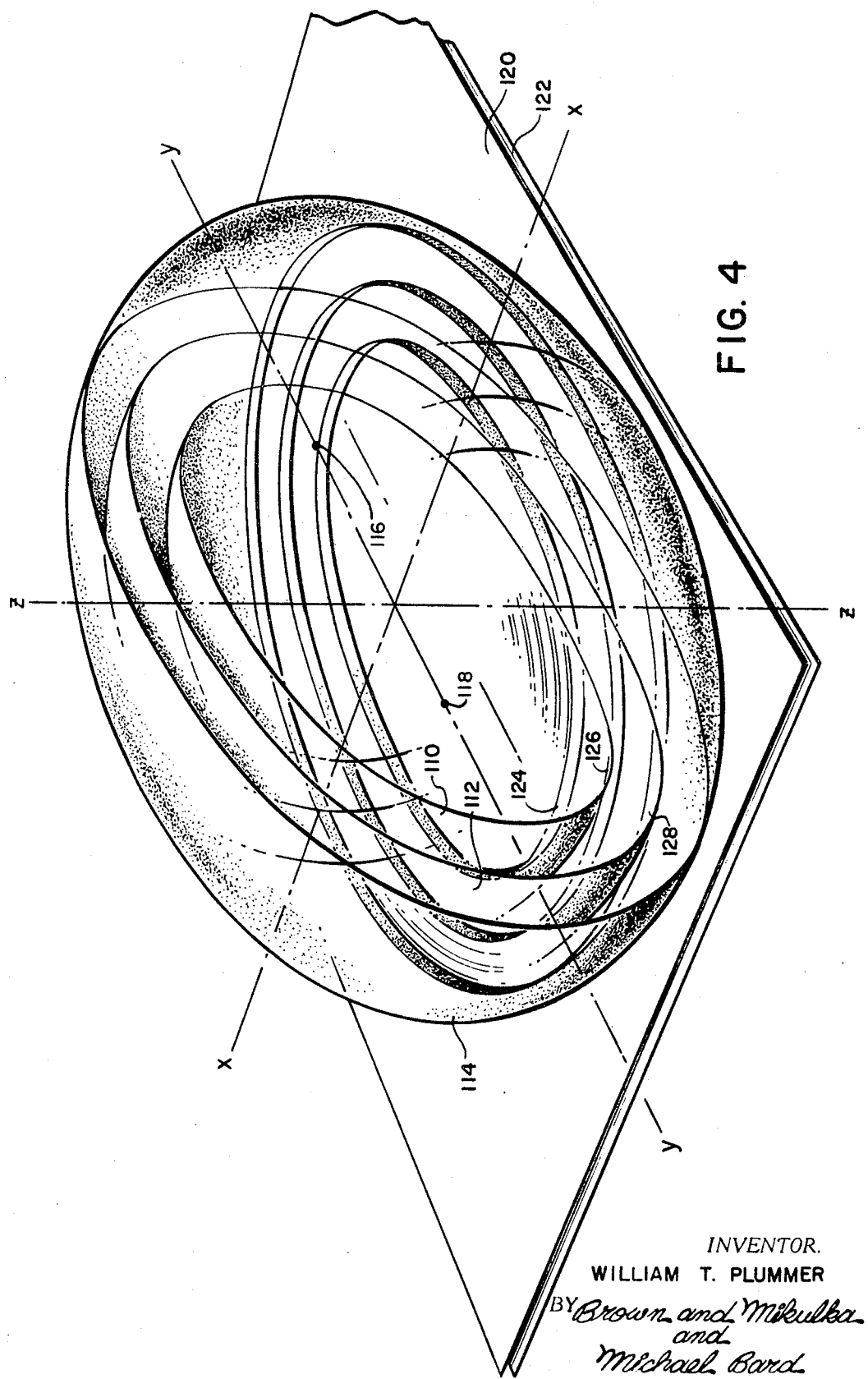
FIG. 4 provides a pictorial perspective illustrating some of the principles of the present invention.

Consider now a pair of parallel planes 120 and 122 spaced sufficiently close to approximate a single plane defined by the X—X and Y—Y axes. If such a plane were to pass through the ellipsoids 110, 112, and 114, as shown in FIG. 4, their respective intersections would define concentric ellipsoidal segments 124, 126, and 128, respectively. Because the planes 120 and 122 are so closely spaced, the ellipsoidal segments 124, 126, and 128 will effectively lie in a single plane and will generally appear as concentric ellipses when viewed normal to the X—X—Y—Y plane. With the planes 120 and 122 sufficiently close, as aforesaid, the ellipsoidal segments 124, 126, and 128, respectively, will be sufficiently thin so as to approximate a straight line in cross-section.

As clearly seen in FIG. 4, the slope of such cross-section with respect to the Z—Z axis will, unlike the slope of a spherical segment, be non-uniform, i.e., it will change about the periphery of each of said ellipsoidal segments 124, 126, and 128, respectively.

Clearly, where the inner surfaces of the ellipsoids 124, 126, and 128 are reflective, a light source positioned at say the focus 116 and impinging on any point within any of the ellipsoidal segments 124, 126, and 128, will be reflected to the focus 118. Because of the geometrical properties of an ellipsoid, such reflection will take place without introducing any comatic or astigmatic aberration into the image of the light source focused at the point 118.

If we now consider a very large number of ellipsoids such as the ellipsoids 110, 112, and 114, intersecting the planes 120 and 122, it is clear that a large number of concentric ellipsoidal segments such as 124, 126, and 128 may be effected whereby positioning a light source at one of said foci will effect an image of said light source at the other of said foci. Considered in another vein, where a large number of ellipsoidal segments such as 124, 126, and 128 are formed, a relatively planar reflecting surface may be created whereby substantially all of the light from a source positioned at one of the foci of the ellipsoids will be reflected to the other of the foci of the ellipsoids. Such is the principle by which the novel focusing screen 64 of FIG. 1 is constructed, with one of the foci corresponding to the pupil point 86 and the other of said foci being defined by the apparent position of the center of the entrance aperture 66.

The "apparent" position of the center of the entrance aperture 66 is referred to because the optical path line 80 (FIG. 1) from the focusing screen 64 to the entrance aperture 66 courses first to the reflex viewing mirror 30 such that the entrance aperture 66 will appear, with respect to the focusing screen 64, to lie behind the reflex viewing mirror 30. Thus, with the focusing screen 64 constructed in accordance with the teachings aforesaid, it is clear that substantially all of the light entering the camera 10 through the objective lens assembly 14 and reflected off the reflex viewing mirror 30 to the focusing screen 64 will be reflected from said focusing screen 64 through said entrance aperture 66 (via the upper portion of said reflex viewing mirror 30) into the viewing device 34.

Figure 5:
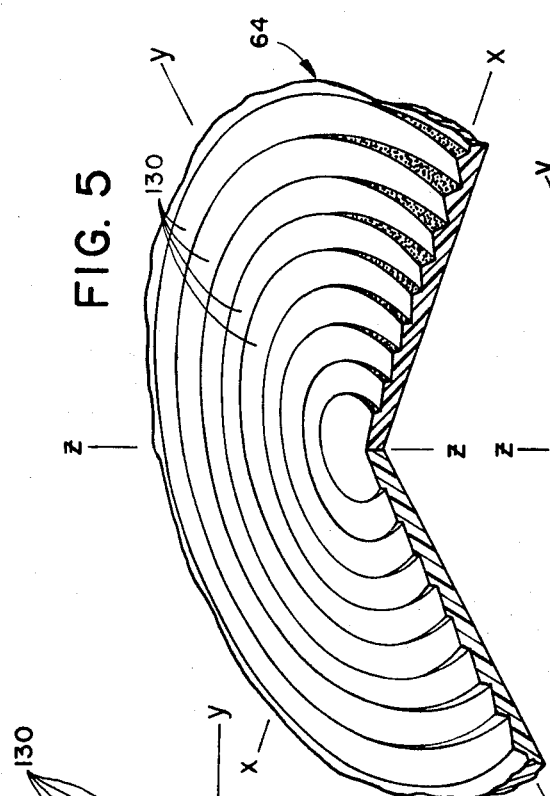
FIG. 5 provides a perspective of one embodi-ment of the subject invention, partly in section.
Figure 7:
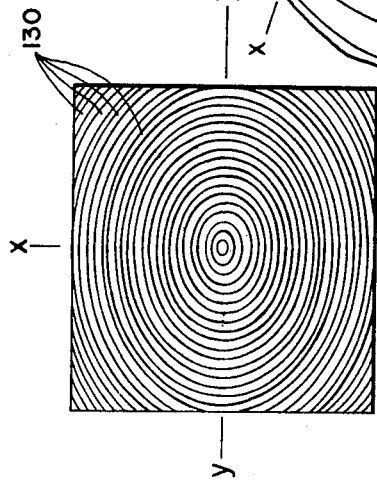
FIG. 7 provides a top plan of the invention as illustrated in FIG. 5.

Referring again to FIG. 5, the focusing screen 64 of FIG. 1 is shown constructed according to one embodiment of the present invention. The focusing screen 64 of FIG. 5 is shown in perspective, partly in section, oriented with respect to the X—X, Y-Y, and Z-Z axes described in conjunction with FIG. 4. Focusing screen 64 (of FIG. 5) is seen to comprise a plurality of concentric echelon surfaces 130 which, as best seen in FIG. 7, are of elliptical shape in the plane defined by the X—X and Y—Y axes. Referring again to FIG. 5, the echelon surfaces 130 are shown to vary in cross-sectional slope moving outward from the Z axis. Furthermore, the variance in cross-sectional slope is seen to differ along the X—X axis from that along the Y—Y axis. Such variance in cross-sectional slope is due to the fact that the echelon surfaces 130 approximate segments of ellipsoids wherein the major and minor axes are of different length.

Figure 10:
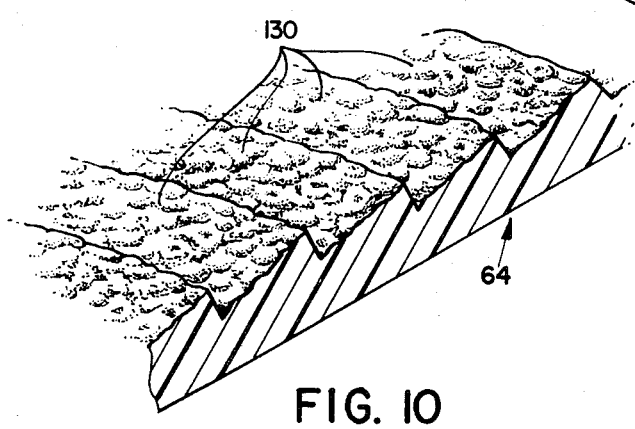
FIG. 10 provides a fragmentary perspective, partly in section, illustrating the surface of the embodiments of FIGS. 5 and 6 in greater detail.

Typically, the focusing screen 64 is comprised of acrylic or vinyl and the echelon surfaces 130 are provided with a reflective coating of aluminum protected with a halfwave dielectric coating of $SiO_2$. Note, however, that the echelon surfaces 130 are not perfectly smooth but are (as best illustrated in FIG. 10) characterized by smooth bumps or granulations or other perturbations in accordance with the teachings of U. S. Patent Application, Ser. No. 103,199, filed Dec. 31, 1970, by William T. Plummer.

By virtue of such granulations, perturbations, or the like, light incident on any of the echelon surfaces 130 will be randomly distributed within a predetermined solid angle, whereby the focusing screen 64 may still direct substantially all of the light incident thereon (from the entrance pupil 84) through the entrance aperture 66 (FIG. 1), but with a controlled random dispersion to such light. By virtue of such perturbations or the like, an observer need only determine whether an image is sharply focused on the screen 64 in order to properly focus the objective lens assembly 14 of the camera 10 of FIG. 1.

In contradistinction, with specular reflection, e.g., with the echelon surfaces 130 perfectly smooth, the focusing screen 64 would merely change the direction of the ight rays incident thereon and an observer would have to decide where the image of a subject lies in order to properly focus said objective lens assembly 14.

Thus, the focusing feature of the screen 64 is retained due to the random dispersion, while the brightness of the image is preserved by reflecting substantially all of the light reaching said screen 64 from said entrance pupil 84 through said entrance aperture 66 to the viewing device 34.

It has been found that a less expensive and still satisfactory focusing screen may be effected by forming the echelon surfaces 130 whereby they will provide a first order approximation to a series of ellipsoidal segments. Such a first order approximation may be effected by forming a focusing screen, indicated by the designation 64', wherein the cross-sectional slopes of the echelon surfaces with respect to the Z-Z axis conform to those of ellipsoidal segments such as the echelon surfaces 130 of FIG. 5, but with each echelon surface being generally circular in the plane defined by the X—X and Y—Y axes. Such a first order approximation is best illustrated in the embodiment of FIGS. 6 and 8.

Figure 6:
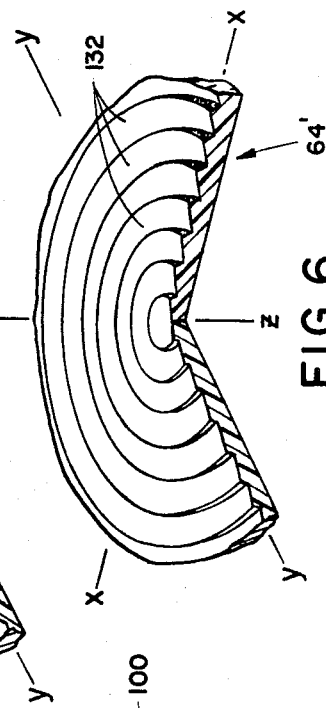
FIG. 6 provides a perspective of a second embodiment of the subject invention, partly in section.

Looking to FIG. 6 in more detail, the focusing screen 64' is seen to comprise a plurality of concentrically arranged echelon surfaces 132. Comparing the focusing screen 64' of FIG. 6 with the focusing screen 64 of FIG. 5, it is seen that the cross-sectional slope of the echelon surfaces 132, along the X—X axis, approximates that of the echelon surfaces 130. Similarly, it may be seen that the cross-sectional slope of the echelon surfaces 132 along the Y—Y axis approximates that of the echelon surfaces 130.

Figure 8:
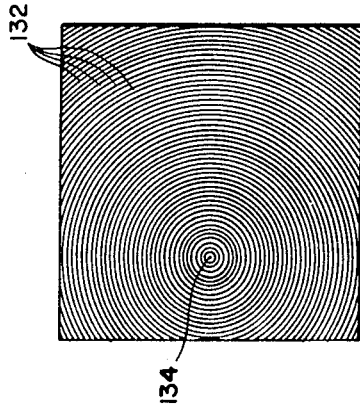
FIG. 8 provides a top plan of the embodiment illustrated in FIG. 6.

Looking to FIG. 8 in more detail, it is seen that the echelon surfaces 132 differ markedly from the echelon surfaces 130 of FIG. 7 in that said echelon surfaces 132 are seen to be circular in the plane defined by the X—X and Y—Y axes. Although some inaccuracies are attendant in the use of the embodiment of FIG. 8 for the focusing screen in place of the embodiment of FIG. 7, such inaccuracies may be minimized by arranging the echelon surfaces 132 so that their common center 134 does not lie at the center of the screen 64'. The position of the center 134 with respect to the center of the screen 64' is determined with reference include the entrance pupil 84 and the exit pupil, defined by the entrance aperture 66, as in the off-axis use of a common Fresnel mirror such as illustrated in FIG. 3.

Figure 9:
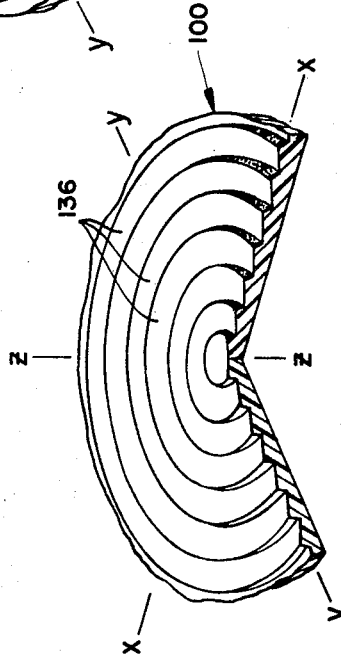
FIG. 9 provides a perspective, partly in section, of the prior art device of FIG. 3.

Although the focusing screen 64' of FIG. 8 may appear quite similar to the prior Fresnel mirror of FIG. 3, a difference may be made apparent by reference to FIG. 9 in comparison with FIG. 6. Note that the Fresnel mirror 100 of FIG. 9 is shown positioned with reference to the same X—X, Y—Y, and Z—Z axes as the focusing screen 64' of FIG. 6. It is at once apparent that the echelon surfaces 136 differ markedly in cross-sectional slope, with respect to the Z axis, from the echelon surfaces 132 of the focusing screen 64'. This difference in cross-sectional slope accounts for the markedly increased brightness at the eye station 82 of the camera 10 illustrated in FIG. 1 when the focusing screen 64' of FIG. 6 is used in place of a prior art Fresnel mirror such as is illustrated in FIGS. 3 and 9.

Figure 11:
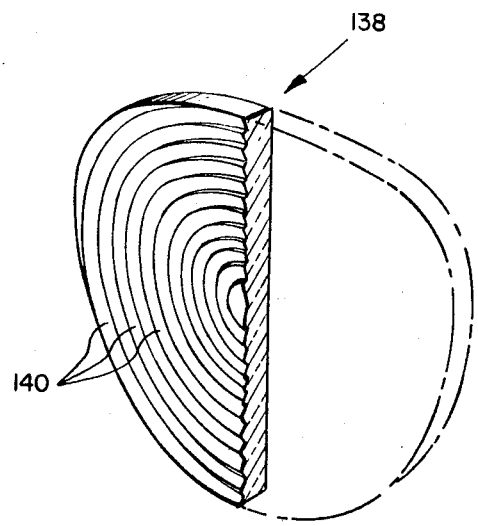
FIG. 11 provides a fragmentary perspective, partly in section, of a third embodiment of the subject invention.

It has been found that the principles described hereinabove are equally applicable to refracting devices as they are to reflecting devices. Referring again to FIG. 11, a generally planar lens is shown at 138 having a plurality of concentric echelon surfaces 140 which are of identical construction to the echelon surfaces 130 with the exception that the echelon surfaces 140 do not have any reflective coating thereon. Additionally, of course, it is necessary that the generally planar lens 138 be constructed of an optically transparent material.

Typically, a lens such as the lens 138 may be used in conjunction with, e.g., common eyeglasses, as an overlay to provide optical correction for aberrations such as astigmatism. Of course, the echelon surfaces 140 may be made of a more simplified construction such as the echelon surfaces 132 of FIG. 6 where extreme precision is not required.

Furthermore, it should be noted that the teachings herein are equally applicable to the formation of essentially planar reflective and refractive optical elements for correcting special aberrations. In such ases, it may be desired that the echelon surfaces such as 130, 132, or 140 be of a shape characterized by a particular polynomial and that their cross sectional slope vary according to some predetermined polynomial function.

Accordingly, in the light of the aforementioned teachings, it can readily be seen that many variations and modifications of the present invention are possible and it will be apparent to those skilled in the art that various changes in form and arrangement of components may be made to suit requirements without departing from the spirit and scope of the invention. It is, therefore, to be understood that within the scope of the appended claims, the instant invention may be practised in a manner otherwise than is specifically described herein.

What is claimed is:

1. In combination with a photographic camera having means defining an entrance pupil and an exit pupil, monolithic means having an axis and including plural echelon arranged reflective surfaces, each having a non-uniform pitch with respect to said axis, for reflecting substantially all of the light passing through said entrance pupil to said exit pupil and minimizing comatic and astigmatic aberration.

2. The invention as related in claim 1, wherein each of said plural reflective surfaces is characterized by a polynomial equation which differs from the equation characterizing any other of said surfaces by a predetermined function and all of said plural reflective surfaces are coaxial.

3. The invention according to claim 2, additionally including means for imaging an object onto said echelon arranged reflecting surfaces whereby light therefrom will be condensed at said exit pupil.

4. A photographic camera including:
means defining an exposure plane;
means defining an entrance pupil;
lens means for focusing the image of a subject through said entrance pupil at a focal plane;
means establishing an optical path from said lens means to said focal plane, said optical path having specular means positioned therein for establishing said focal plane at said exposure plane when in an exposure mode and for establishing said focal plane at a viewing surface having an axis and situate near or at said exposure plane when in a focusing mode;
means defining an exit pupil with at least one of said entrance and exit pupils positioned off said axis; and
viewing means cooperable with said exit pupil defining means for inspecting the image formed on said viewing surface through said exit pupil, said viewing surface being essentially planar and comprising plural, coaxial, structurally dependent and continuous reflective surfaces each so spatially oriented as to exhibit a variable pitch with respect to said axis and to maximize the reflection of light from said entrance pupil through said exit pupil without introducing comatic of astigmatic aberration.

5. The invention as set forth in claim 4, wherein said entrance pupil has a pupil point located at a first predetermined point with respect to said viewing surface and said exit pupil has a pupil point in spaced predetermined relation to said entrance pupil point.

6. The invention as delineated in claim 5, wherein each said reflective surface approximates an ellipsoidal segment having foci corresponding to said entrance and exit pupil points.

7. The invention according to claim 6, wherein said plural reflective surfaces each nclude surface means coextensive therewith for randomly dispersing light incident thereon, said surface means characterized by smoothly contoured granular shapes.

8. In combination with a photographic camera comprising means having an axis including an entrance pupil; means for imaging said entrance pupil at a predetermined remote location off said axis, including:
a support;
plural structurally dependent, continuous surfaces in echelon arrangement disposed along one surface of said support, each having a variable cross-sectional pitch with respect to said axis; and
means cooperable with said plural surfaces for reflecting the light from said entrance pupil to said predetermined remote location so as to define an exit pupil whilst minimizing comatic and astigmatic aberration.

9. The invention according to claim 8, wherein said reflecting means includes means for randomly dispersing light incident thereon within a predetermined solid angle.

10. The invention according to claim 9, wherein said plural structurally dependent surfaces and said reflecting means comprise continuous reflective surfaces each so oriented as to approximate a segment of an ellipsoid having foci corresponding to said entrance and exit pupils.

11. An imaging and viewing system, including:
means defining an entrance pupil;
lens means for forming an image of a subject through said entrance pupil at a focal surface;
a reflective screen located at said focal surface;
means defining an exit pupil; and
viewing means cooperable with said exit pupil defining means for inspecting the image formed on said screen through said exit pupil, said screen reflecting light incident thereon through said exit pupil and being essentially planar and comprising plural, structurally dependent and continuous reflective surfaces each being of a variable cross-sectional pitch.

12. The invention as delineated in claim 11, wherein said entrance pupil has a pupil point located at a first predetermined point with respect to said screen and said exit pupil has a pupil point in spaced predetermined relation to said entrance pupil point.

13. The invention as set forth in claim 12, wherein each of said plural reflective surfaces conforms to a predetermined polynomial equation which differs from the equation characterizing each of the other of said plural reflective surfaces by a constant.

14. Apparatus according to claim 13, wherein said plural reflective surfaces are so dispersed as to provide an approximation of the intersections of a plurality of coaxial ellipsoidal surfaces having common foci with a pair of closely spaced parallel planes.

15. A viewing system for use with a camera having means defining an entrance pupil and an exit pupil with entrance and exit pupil points, respec-tively, in predetermined spaced relation; said viewing means including:
   a screen having an axis a predetermined distance from at least one of said pupil points;
   means for focusing the image of a subject onto said screen; and
   a plurality of continuous reflective surfaces, each being characterized by a polynomial equation which differs from that characterizing any other of said surfaces by a predetermined function, arranged on the surface of said screen in echelon order for reflectively focusing light reaching said screen from said entrance pupil to said exit pupil and minimizing comatic and astigmatic aberration.

16. The invention according to claim 13, wherein said reflective focusing means comprises monolithic means including a plurality of echelon arranged surfaces each having a non-uniform cross-sectional pitch.

17. A viewing system for use with a camera having means defining an entrance pupil; said viewing system including:
   a screen having an axis of symmetry;
   means for focusing the image of a subject onto said screen; and
   means disposed along one surface of said screen for imaging said entrance pupil at a predetermined remote location away from said axis and minimizing comatic and astigmatic aberration in such image, said imaging means comprising plural echelon arranged surfaces each approximating a different ellipsoidal segment in at least two mutually orthogonal planes.

18. The invention as set forth in claim 17, wherein said entrance pupil imaging means is integral with said screen.

19. The invention as delineated in claim 18, wherein said entrance pupil imaging means includes surface means for randomly dispersing light incident thereon, said surface means characterized by smoothly contoured granular shapes.

20. Viewing means for use with a photographic camera of the type having means defining an exposure plane, means defining an entrance pupil, and lens means for focusing the image of a subject through said entrance pupil at a viewing surface; said viewing means including:
   means for inspecting the image formed on said viewing surface at an exit pupil; and
   means for maximizing the illumination reaching said exit pupil from said viewing surface by imaging said entrance pupil at said exit pupil whilst minimizing aberrations in such entrance pupil image, said maximizing means comprising plural echelon arranged surfaces each of non-uniform slope with respect to an axis of symmetry normal to said viewing surface.

21. The invention as set out in claim 20, wherein said viewing surface is essentially planar and comprises plural, coaxial, structurally dependent, and continuous reflective surfaces.

22. The invention as recited in claim 21 wherein each reflective surface has a cross-sectional slope approximating that of an ellipsoidal segment.

23. In combination with a photographic camera including means having an entrance pupil; means for imaging said entrance pupil at a predetermined remote location, including:
   a support; and
   plural, structurally dependent, continuous surfaces in echelon arrangement disposed along one surface of said support, having an axis of symmetry spaced from said entrance pupil and so spatially positioned and of such shape as to approximate an ellipsoid, whereby said entrance pupil may be imaged to said remote location so as to define an exit pupil by maximizing the light from said entrance pupil reaching said exit pupil and minimizing comatic and astigmatic aberration in the image of said entrance pupil defining said exit pupil.

* * * * *